(12) United States Patent
Lee et al.

(10) Patent No.: US 8,202,590 B2
(45) Date of Patent: Jun. 19, 2012

(54) HEAT SHRINKABLE MULTILAYER FILM OR TUBE THAT EXHIBITS SHRINK STABILITY AFTER ORIENTATION

(75) Inventors: I-Hwa Lee, Wilmington, DE (US); Heiko E. Schenck, Eppstein, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 175 days.

(21) Appl. No.: 11/880,814

(22) Filed: Jul. 23, 2007

(65) Prior Publication Data

US 2009/0029081 A1 Jan. 29, 2009

(51) Int. Cl.
*B32B 1/08* (2006.01)
*B32B 27/08* (2006.01)
*B32B 27/32* (2006.01)
*B32B 27/36* (2006.01)

(52) U.S. Cl. ...... 428/35.4; 428/35.7; 428/483; 428/515; 428/520

(58) Field of Classification Search .............. 428/35.9, 428/483, 515, 520, 35.4
See application file for complete search history.

(56) References Cited

U.S. PATENT DOCUMENTS

| | | | |
|---|---|---|---|
| 4,713,296 A | | 12/1987 | Aoyama et al. |
| 4,865,902 A | * | 9/1989 | Golike et al. ............ 428/215 |
| 4,911,979 A | | 3/1990 | Nishimoto et al. |
| 4,939,040 A | | 7/1990 | Oreglia et al. |
| 5,037,703 A | | 8/1991 | Negi et al. |
| 5,053,259 A | | 10/1991 | Vicik |
| 5,126,402 A | | 6/1992 | Chou |
| 5,286,575 A | | 2/1994 | Chou |
| 5,387,470 A | | 2/1995 | Parnell et al. |
| 6,146,726 A | | 11/2000 | Yoshii et al. |
| 6,372,359 B1 | | 4/2002 | Hayashi et al. |
| 2005/0186373 A1 | * | 8/2005 | Rhee et al. ............ 428/35.7 |
| 2007/0092744 A1 | * | 4/2007 | Di Tella et al. ............ 428/475.8 |
| 2007/0172614 A1 | | 7/2007 | Lee |

FOREIGN PATENT DOCUMENTS

| | | |
|---|---|---|
| EP | 0217252 B1 | 11/1991 |
| EP | 0571260 A2 | 11/1993 |
| EP | 0447988 B1 | 10/1996 |
| EP | 0987103 B1 | 1/2004 |
| EP | 1563990 B1 | 8/2004 |

OTHER PUBLICATIONS

R. Chou & I.H. Lee, *The Behavior of Ethylene Vinyl Alcohol Amorphous Nylon Blends in Solid Phase Thermoforming*, J. Plastic Film & Sheeting, 13, 74-93, 1997.

K. Djezzar et al., "*Tensile Drawing of Ethylene/Vinyl Alcohol Polymers: Part 1, Influence of Draw Temperature on the Mechanical Behaviour*", Polymer, 39, 3945, 1998.
T. Okaya & K. Ikari, Chapter 8, *Ethylene Vinyl Alcohol Copolymers*, Polyvinyl Alcohol Developments, (C. A. Finch, ed.) John Wiley, New York, 1992; and R. Chou & I.H. Lee, supra.
Eval Americas Technical Bulletin No. 150 "Thermoforming of Eval® Resin Containing Structures".
International Search Report for PCT/US2008/070728 dated Sep. 19, 2008.
Food Communications Information Service, Irish Food Packaging Information Service, Plastics, at http://www.ucc.ie.fcis/PKplastics.htm.
DuPont Nucrel®1202HC Ethylene-Methacrylic Acid Copolymer Resin for Blown and Cast Film, at http://www.MATWEB.COM.
Morris et al, "The Influence of Sealant Modulus on the Bending Stiffness of Multilayer Films", Proceedings of the 1997 TAPPI Polymers, Laminations and Coatings Conference, pp. 165-172.
McKenna et al., "Change the Package, Keep the Feel", Proceedings of the 2010 TAPPI Place Conference, Apr. 8-21, 2010, Albuquerque, NM.
"Film Bending Stiffness Test", E. I. du Pont de Nemours and Company, DuPont Packaging and Industrial Polymers, Jan. 1998.
"EVALTM SP521 Data Sheet—High Orientability Ethylene Vinyl Alcohol Copolymer", EVAL Americas, Nov. 2008.
Elvaloy® AC Resin Data Sheet, E. I. du Pont de Nemours and Company, Apr. 4, 2005.
Nucrel® Ethylene Acid Copolymer Resins Data Sheet, E. I. du Pont de Nemours and Company, Oct. 1999.
Elvax® Resin Data Sheet, E. I. du Pont de Nemours and Company, 1999.
"EVALTM SP292 Data Sheet—High Orientability Ethylene Vinyl Alcohol Copolymer", EVAL Americas, Nov. 2008.
Surlyn® Ionomer Resin Selector Guide, E. I. du Pont de Nemours and Company, Sep. 1994.

\* cited by examiner

*Primary Examiner* — Rena Dye
*Assistant Examiner* — Erik Kashnikow

(57) ABSTRACT

Heat shrinkable oriented multilayer films are disclosed that comprise a structural layer, a heat sealing layer and a gas barrier layer. The structural layer comprises a polymer selected from the group consisting of copolymers of ethylene and a $C_3$ to $C_8$,-ethylenically unsaturated carboxylic acid, ionomers of the copolymers, polyesters, and blends thereof. The heat sealing layer comprises a polymer selected from the group consisting of ethylene vinyl acetate copolymers, ethylene alkyl acrylate copolymers, ethylene alkyl methacrylate copolymers, polyethylene, and blends thereof. The barrier layer, which is positioned between the structural and heat sealing layer, comprises at least one ethylene vinyl alcohol copolymer that has from about 2 to about 8 mol % 1,2-glycol structural units incorporated in the copolymer backbone chain. The films are particularly suitable for use in manufacture of shrinkbags.

28 Claims, No Drawings

HEAT SHRINKABLE MULTILAYER FILM OR TUBE THAT EXHIBITS SHRINK STABILITY AFTER ORIENTATION

FIELD OF THE INVENTION

This invention relates to heat-shrinkable laminated films that are particularly useful in packaging applications.

BACKGROUND OF THE INVENTION

Biaxially oriented film laminates are used commercially on a large scale in shrink packaging of food items. For example, biaxially oriented polyvinylidene chloride (PVDC) laminates have been used extensively in manufacture of packaged meat and cheese products, in part because these laminates exhibit excellent shrink characteristics. Although the physical properties of PVDC are well suited to packaging applications, a number of processability deficiencies are associated with its use. In particular, PVDC is thermally unstable, necessitating the use of specialized equipment to handle PVDC film. Moreover, PVDC is prone to development of gels and carbonized particles on exposure to high temperature for extended periods. Therefore, special care must be taken during PVDC film manufacture in order to produce high quality product having minimal levels of black specks. PVDC is also known to discolor during electron beam irradiation. In addition, shrinkbags that are formed from multilayer films of PVDC and ethylene vinyl acetate (EVA) are deficient in toughness. To address this problem, patches are often placed on the bags to provide additional protection for the packaged products, for example in packaging of bone-in meat. The patches are unsightly and placement requires additional processing steps.

A number of nylon-based compositions adapted for use in shrinkbags have been developed as a means to overcome the various shortcomings of PVDC bags. For example, U.S. Pat. No. 5,053,259 describes an oriented multilayer film comprising a blend of amorphous nylon copolymer and a copolyamide having a melting point of at least 145° C. The first outer layer comprises a polyolefin, ionomer, PVDC, EVA or ethylene vinyl alcohol (EVOH) copolymer or mixtures thereof. The compositions of the examples exhibit shrinkage values at 90° C. of 15% to 51%. European Patent 0987103B1 describes a multilayer film that is biaxially oriented at a stretch ratio of greater or equal to 3:1 in the machine direction and 6:1 in the transverse direction. The film has an outer heat sealing layer comprising a polyolefin, including copolymers of ethylene and polar comonomers and another layer of crystalline or partially crystalline copolyamide, optionally containing EVOH. The film has a free shrink in each direction of at least 10% at 120° C. and compositions are disclosed that exhibit free shrink of up to 56% at 120° C.

Although shrinkbags that are composed of nylon have desirable properties, they also exhibit certain property limitations. For example, such bags tend to be stiff compared to PVDC-based shrinkbags and may be less compatible with many packaging operations that are suitable for the softer PVDC bags. Also, nylon shrinkbags cannot achieve shrink levels after orientation that are as high as those of PVDC shrinkbags. This is due to post-crystallization of the nylon-containing film that occurs at room temperature after the extrusion and orientation processes are complete. In consequence, variable and unpredictable degrees of shrinkage occur depending on storage conditions. Post-crystallization occurs to the greatest extent within the first two to three weeks after manufacture of the oriented film. It is common for commercially produced PVDC bags to attain 50 to 60% shrink at 95° C., both off-line and after storage or aging at room temperature for several weeks. In contrast, nylon-containing shrinkbags rarely exhibit greater than 40% shrink at 95° C. after storage or aging. In general, shrinkages of between 20% and 40% after aging are typical for nylon-containing films. Shrinkage at temperatures below 95° C. is even less. Bag manufacturers are forced to compensate for this deficiency by manufacturing lay-flat bags in a larger size to accommodate this phenomenon. In addition, this necessitates maintaining inventories of various sized bags, which is inefficient.

Shrink films and shrinkbags having barrier layers comprising EVOH are also known. For example, European Patent 0217252B1 describes a film comprising an outer polymer layer and an inner heat sealing layer, optionally having an EVOH oxygen barrier layer between the inner and outer layers. The heat-sealing layer comprises a linear copolymer of ethylene and an $\alpha$-olefin. The heat sealing layer may further comprise of a polymer which is compatible with the ethylene/$\alpha$-olefin copolymer and is selected from the group consisting of linear low density polyethylene, linear high density polyethylene, low density polyethylene, EVA, acid-modified EVA, polypropylene, ethylene/propylene copolymers, ionomers and ethylene/alkyl acrylate copolymers. The polymer of the outer layer may be selected from copolymers of ethylene and an $\alpha$-olefin, EVA, polyamide, and ionomeric resins and the barrier layer can be PVDC or EVOH.

European Patent 0447988B1 discloses a heat-shrinkable multilayer thermoplastic film having (a) a thermosealing layer, (b) a gas barrier layer selected from copolymers of vinylidene chloride, EVOH copolymers, polyamides or copolyamides and blends of these polymers; (c) at least one polymeric structural layer formed of a polymer selected from ethylene copolymers of very low density polyethylene, high density polyethylene, linear low density polyethylene, ethylene copolymers with vinyl or acrylic comonomers, ionomers, olefinic polymers and copolymers modified with functional groups, polyamides, polyesters, copolyesters, and blends of these polymers, and (d) optionally at least one adhesive layer.

Co-pending U.S. patent application Ser. No. 11/644,976 discloses a heat shrinkable multilayer film wherein a first layer comprises a polymer selected from the group consisting of EVOH, polyamides and mixtures thereof, a second layer comprises a polymer selected from the group consisting of polyethylene homopolymers, ethylene copolymers, polypropylene homopolymers, propylene copolymers, polyesters, polyamides, polyvinyl chloride, polycarbonates, cyclic olefin polymers and mixtures thereof and a third adhesive layer is present, positioned between and in contact with the first and second layers. The third layer consists essentially of a blend of a two ethylene copolymers, one of which is a functionalized ethylene copolymer, and a tackifier resin.

European Patent 0571260 discloses a film comprising two exterior layers, the layers composed of at least a thermoplastic ionomer resin; an internal barrier layer comprising a thermoplastic ethylene vinyl alcohol copolymer with a semi-crystalline structure; and preferably adhesive layers situated between the barrier layer and each of the outer layers. The adhesive layers are preferably ethylene vinyl acetate copolymers.

European Patent 1563990 discloses a multi-layer, biaxially oriented and biaxially heat-shrinkable, gas barrier, thermoplastic film composed of a first outer layer comprising ethylene homo- or copolymers; a core gas barrier layer such as EVOH; a second outer thermoplastic layer; and an inner layer comprising terpolymers of propylene, ethylene and $C_4$-$C_8$ alpha-olefins.

U.S. Pat. No. 4,939,040 discloses a stretchable multilayer film with gas permeability below 50 cm$^3$ O$_2$/24 hr/m$^2$/atm., comprising a barrier layer prepared from, for example, EVOH containing 1 to 20 weight % of a stiffness modifier; and stretchable layer(s) preferably selected from copolymers of ethylene with vinyl acetate, methyl acrylate or butyl acrylate; optionally further comprising at least one outer thermosealing layer prepared from, among others, ionomeric resins or EVA.

U.S. Pat. No. 6,146,726 provides a heat-shrinkable multilayer film comprising an outermost layer, a gas barrier layer as a core layer and a sealing layer as the innermost layer, where the sealing layer is formed of a material comprising a linear ethylene-1-octene copolymer obtained by using a constrained geometry catalyst. An intermediate layer between the outermost layer and the core layer is formed of at least one resin selected from the group consisting of polyamide resins, thermoplastic polyester resins and ethylene copolymer resins. The gas barrier layer can be EVOH. The outermost layer is formed of at least one polyethylene terephthalate copolyester resin.

U.S. Pat. No. 5,387,470 discloses a multilayer film comprising a first core layer comprising very low density polyethylene or linear low density polyethylene and two outer layers each comprising an ionomer. The film may also include additional core layers and/or an oxygen barrier layer such as EVOH and may be oriented to provide a heat shrinkable film.

EVOH film laminates of these types have excellent barrier properties. However, EVOH can be challenging to orient in multilayer structures. The difficulty in stretching EVOH has been attributed in part to a particular mechanical characteristic of EVOH. That is, with increasing orientation temperature, stress-induced crystallization rates increase dramatically. As a result, higher levels of crystallinity are found in EVOH that is oriented at temperatures of about 70° C. to about 160° C. compared to EVOH that is heated, but not oriented at these temperatures. (See R. Chou & I. H. Lee, *The Behavior of Ethylene Vinyl Alcohol Amorphous Nylon Blends in Solid Phase Thermoforming*, J. Plastic Film & Sheeting, 13, 74-93, 1997). Rupture of the existing crystal morphology takes place in EVOH laminated films that have been oriented at these temperatures, leading to necking of the EVOH layer and creation of breaks in the EVOH, thereby making it difficult to obtain uniform stretching of the laminated film. Another aspect related to stretching of EVOH is the presence of a sharp yield point, as measured in stress-strain curves, followed by strain-hardening. These deformation phenomena lead to propagation of necking during orientation. It has been shown that when drawing takes place at 80° C., deformation is homogeneous, but becomes much more heterogeneous at drawing temperatures of 120° C. (See K. Djezzar et al., "*Tensile Drawing of Ethylene/Vinyl Alcohol Polymers: Part 1, Influence of Draw Temperature on the Mechanical Behaviour*", Polymer, 39, 3945, 1998). To further compound the difficulty of orienting EVOH, when EVOH is coextruded with other polymers in a multilayer structure the softening temperature range of the polymers in the other layers of the multilayer film frequently does not overlap well with the optimal stretching temperature range for EVOH, resulting in stretching of the combined structure that is not optimal (see T. Okaya & K. Ikari, Chapter 8, *Ethylene Vinyl Alcohol Copolymers*, Polyvinyl Alcohol Developments, (C. A. Finch, ed.) John Wiley, New York, 1992; and R. Chou & I. H. Lee, supra). Eval Americas Technical Bulletin No. 150 "Thermoforming of Eval® Resin Containing Structures" describes the art of thermoforming as being very similar to the process of biaxially orientating polyolefins. As disclosed therein, during solid phase pressure forming of polypropylene EVOH sheet, the use of 32 mole % ethylene EVOH, such as EVAL F101 ethylene vinyl alcohol copolymer resin is not recommended, as the rapid crystallization rate of EVOH at the optimum forming temperature range for polypropylene leads to the formation of cracks.

Various approaches to improving the stretchability of EVOH have been developed. Most of these approaches have involved blending of other polymers into EVOH. For example, U.S. Pat. No. 5,126,402 describes a blend of ethylene vinyl alcohol copolymer blended with 5 to 95 weight % of an amorphous polyamide having fewer than about 0.100 equivalents of carboxyl end groups per kilogram of polyamide. Such a blend provides improved thermal and oxidative stability while providing desirable formability. U.S. Pat. No. 4,911,979 describes a heat shrinkable laminated film comprising at least two layers of a mixed resin layer consisting essentially of 65 to 85 weight % polyamide resin and 15 to 35 weight % of a saponified ethylene vinyl acetate; and a layer containing at least 55 weight % of a saponified ethylene vinyl acetate. Such a laminate can be biaxially stretched while heating the laminate to a temperature of 75° C. but not higher than 100° C. U.S. Pat. No. 5,286,575 describes a blend of ethylene vinyl alcohol copolymer blended with 5 to 95 weight % of an amorphous polyamide copolymer having a glass transition temperature of about 30 to 100° C. with improved simultaneous orientation properties. U.S. Pat. No. 5,037,703 describes a multilayer structure where the ethylene vinyl alcohol copolymer is blended with 5 to 50 weight % of a thermoplastic polyester comprising at least 50 mol % of isophthalic acid based on the total moles of carboxylic acid component and 0.1 to 30 mol % of 1,3 bis(beta-hydroxyethoxy)-benzene and/or diethylene glycol, based on the total moles of diol component. Such a multilayer structure is said to prevent formation of pinholes or cracks during high-speed heat stretching.

Other approaches to improving drawability and stretchability include the use of modified EVOH copolymers and mixtures of EVOH polymers having different properties. For example, U.S. Pat. No. 4,713,296 describes a laminate of modified ethylene vinyl alcohol copolymer containing 0.1 to 5 mol % pyrrolidone ring containing units where the laminate is superior in drawability. U.S. Pat. No. 6,372,359B1 describes a multilayer film of polypropylene with a resin composition comprising two ethylene vinyl alcohol copolymers with different and partially overlapping melt temperature ranges. Such a composition provides high stretchability and excellent gas barrier properties.

It would be desirable to have available multilayer biaxially orientable shrink films of enhanced properties that incorporate EVOH but that also have excellent outer layer toughness and the stiffness exhibited by PVDC. Further, it would be useful if the film laminates were characterized by high shrink with minimal loss of shrinkage over time and could be produced using conventional shrink film production processes and temperatures. If such films additionally exhibited high shrink percentages at temperatures at or below 95° C. they could be used advantageously to produce shrinkbags that would enable more effective preservation of food products.

SUMMARY OF THE INVENTION

In one aspect, the present invention is directed to a multilayer oriented heat shrinkable film comprising:
A) a structural layer comprising a polymer selected from the group consisting of copolymers of ethylene and a C$_3$ to $C_8$ α,β-ethylenically unsaturated carboxylic acid, ionomers of said copolymers, polyesters, and blends thereof;

B) a heat sealing layer comprising a polymer selected from the group consisting of ethylene vinyl acetate copolymers, ethylene alkyl acrylate copolymers, ethylene alkyl methacrylate copolymers, polyethylene, and blends thereof; and C) a gas barrier layer comprising at least one ethylene vinyl alcohol copolymer, said ethylene vinyl alcohol copolymer having from about 2 to about 8 mol % 1,2-glycol structural units present in the polymer chain and said gas barrier layer being positioned between said structural layer and said heat sealing layer;

characterized in that said oriented film is capable of shrinking to a size that is at least 25% less than its original size on initial exposure of said film to a temperature of 85° C. for at least one minute.

The invention is also directed to shrinkbags comprising an oriented multilayer film, said oriented film comprising:

A) a structural layer comprising a polymer selected from the group consisting of copolymers of ethylene and a $C_3$ to $C_8$ α,β-ethylenically unsaturated carboxylic acid, ionomers of said copolymers, polyesters, and blends thereof;

B) a heat sealing layer comprising a polymer selected from the group consisting of ethylene vinyl acetate copolymers, ethylene alkyl acrylate copolymers, ethylene alkyl methacrylate copolymers, polyethylene, and blends thereof; and C) a gas barrier layer comprising at least one ethylene vinyl alcohol copolymer, said gas barrier layer being positioned between said structural layer and said heat sealing layer;

characterized in that said film is capable of shrinking to a size that is at least 25% less than its original size on initial exposure of said film to a temperature of 85° C. for at least one minute.

DETAILED DESCRIPTION OF THE INVENTION

The compositions of the invention are oriented multilayer film laminates that are capable of shrinking to a substantial extent when exposed to temperatures of at least 85° C. The films are members of the class of films conventionally known as "shrink films" or "shrink wraps". Such films find utility in manufacture of "shrinkbags". The compositions of the invention are thus multilayer laminated shrink films and structures made from such films.

Shrink films are oriented films that undergo a stretching operation during manufacture. The films are not heat-set during the manufacturing process. The films are therefore capable of changing dimension by shrinking to close to their unstretched size or dimension on their first, i.e. initial, exposure to temperatures higher than the temperature of their orientation. Shrinkage of such films does not occur to any great extent on subsequent exposures to a temperature above the orientation temperature.

The heat shrinkable films of the invention are generally in the form of flat sheets or in tubular form. They are oriented multilayer laminated structures of thickness 275 microns or less that are capable of shrinking in size by an amount of 25% or more from their original oriented dimensions on initial exposure to a temperature of 85° C. for a time of at least one minute. Preferably the films are capable of shrinking in size by an amount of 35% or more from their original oriented dimensions when exposed to a temperature of 95° C. under such conditions. It is not unusual for applications for shrink bags to require from about 40% to about 50% shrinkage from the original dimensions.

Shrink properties are measured by placing 101 mm×101 mm squares of film, with the machine direction (MD) and transverse direction (TD) of the films marked, into a waterbath maintained at 85° C. for 2 minutes, and then measuring the dimensions of the treated films. The % shrink is calculated as the absolute value obtained from the formula $[(L_1-L_0)/L_0]\times100$, where $L_1$ is the dimension in the machine or transverse directions after shrink, and $L_0$ is the dimension in the machine or transverse directions of the original film.

The multilayer heat shrinkable film compositions of the invention have at least three layers: a structural layer, a barrier layer and a heat sealing layer. The barrier layer is positioned between the structural layer and the heat sealing layer. Additional layers may also be present, preferably between the structural layer and the barrier layer and/or between the barrier layer and the heat sealing layer. In other embodiments, an additional layer or layers may be present in a position external to either the structural or heat seal layer, generally to the structural layer.

The structural layer of the multilayer heat shrinkable films comprises a polymer selected from the group consisting of ethylene acid copolymers, ethylene acid ionomers, polyesters and blends thereof.

Ethylene acid copolymers suitable for use in the structural layer of the multilayer films of the invention comprise copolymerized units of ethylene, copolymerized units of a $C_3$ to $C_8$ α,β-ethylenically unsaturated carboxylic acid, preferably acrylic acid or methacrylic acid, and optionally, copolymerized units of at least one additional comonomer, preferably selected from alkyl acrylates and alkyl methacrylates wherein the alkyl groups have from one to ten, preferably one to four, carbon atoms. Thus, the ethylene acid copolymers may be dipolymers, terpolymers or higher order copolymers. Some particularly useful terpolymers are those wherein the unsaturated acid content is about 2-30 weight %, based on the total weight of the terpolymer. Preferred higher order copolymers include copolymerized units of additional comonomers in an amount of up to about 40 weight % of the copolymer.

Ethylene acid copolymers may be prepared by copolymerization of ethylene and an unsaturated carboxylic acid, for example acrylic acid or methacrylic acid. Terpolymers can be prepared from ethylene, an unsaturated carboxylic acid and a third comonomer such as an alkyl acrylate or alkyl methacrylate. Examples of preparative methods for suitable ethylene acid copolymers may be found in U.S. Pat. Nos. 4,351,931; 4,690,981 and 5,028,674.

Ionomers are acid copolymers wherein at least some of the carboxylic acid groups in the copolymer are neutralized to form the corresponding carboxylate salts. Ionomers can be prepared from the acid copolymers described above, wherein the carboxylic acid groups present as a result of copolymerization of the unsaturated acid are at least partially neutralized by alkali metal ions, transition metal ions, alkaline earth ions or combinations of such cations. Typical methods for preparing ionomers suitable for use in the compositions of the invention are disclosed in U.S. Pat. No. 3,264,272.

Compounds suitable for neutralizing the acid copolymer include ionic compounds having alkali metal cations (for example, lithium, sodium or potassium ions), transition metal cations (for example, zinc ion) or alkaline earth cations (for example magnesium or calcium ions) and mixtures or combinations of such cations. Ionic compounds that may be used for neutralizing the ethylene acid copolymers include alkali metal formates, acetates, nitrates, carbonates, hydrogen carbonates, oxides, hydroxides or alkoxides. Other useful ionic compounds include alkaline earth formates, acetates, nitrates, oxides, hydroxides or alkoxides of alkaline earth metals. Transition metal formates, acetates, nitrates, carbonates, hydrogen carbonates, oxides, hydroxides or alkoxides may also be used. The amount of compound capable of neutralizing acidic groups may be provided by adding the stoichiometric amount of the compound calculated to neutralize a target amount of acid moieties in the acid copolymer.

Suitable ethylene acid copolymers and ionomers that are commercially available include NUCREL ethylene acid copolymers and SURLYN ionomer resins, both available from E.I. du Pont de Nemours and Company.

Polyesters useful as components of the structural layer include polymers made by condensation polymerization of diols and diacids (or derivatives thereof) that are suitable for forming films. Of note are polyesters comprising aromatic dicarboxylic acids as a diacid monomer. Examples include polyethylene terephthalate, polytetramethylene terephthalate, polycyclohexane-dimethylene terephthalate and polyethylene-2,6-naphthalene dicarboxylate. These polyesters may also be copolymers that comprise copolymerized units of either another alcohol and/or another dicarboxylic acid. A portion of the dicarboxylic acid comonomers may be isophthalic acid, 2,6-naphthalenedicarboxylic acid, 1,4-cyclohexanedicarboxylic acid, adipic acid, sebacic acid, dimer acid, and isophthalic acid containing a metal salt of sulfonic acid as a substituent, such as 5-sodium sulfoisophthalate, for example. The diols may include diethylene glycol, neopentyl glycol, 1,4-cyclohexane diol, 1,4-cyclohexanedimethanol, polyalkylene glycol, 1,2 propanediol, 1,3 propanediol (trimethylene glycol) and 1,4 butanediol, for example. Small amounts of a chain-branching agent such as pentaerythritol, trimethylolpropane, trimellitic acid, trimesic acid or boric acid may also be used as comonomers. Mixtures of two or more polyesters may comprise the structural layer of the films of the invention. The term "polyester" as used herein refers generically to any or all of the polymers described above. The polyester blends are preferably blends wherein polyethylene terephthalate, polypropylene terephthalate or polybutylene terephthalate are main components. A particularly preferred polyester is polyethylene terephthalate.

The structural layer may additionally comprise conventional additives used in quantities that do not detract from the ability of the multilayer film of the invention to shrink 25% or more from its original oriented dimensions when heated to a temperature of 85° C. in an initial exposure of at least one minute. Examples of conventional additives used in polymeric materials include plasticizers, impact modifiers, stabilizers including viscosity stabilizers and hydrolytic stabilizers, antioxidants, ultraviolet ray absorbers, antistatic agents, dyes, pigments or other coloring agents, inorganic fillers, fire-retardants, lubricants, reinforcing agents such as glass fiber and flakes, foaming or blowing agents, processing aids, antiblock agents, release agents, and mixtures thereof. Optional additives, when used as components of the structural layer, can be present in various quantities, for example, generally in amounts up to about 20 weight % of the total weight of the composition of the structural layer.

The oriented multilayer films of the invention also comprise a heat sealing layer. This layer comprises a polymer selected from the group consisting of ethylene vinyl acetate copolymers, ethylene alkyl acrylate copolymers, ethylene alkyl methacrylate copolymers, polyethylenes and mixtures thereof. The polymer or mixture of polymers, i.e. the sealant, is a composition that can be bonded to itself (sealed) at temperatures substantially below the melting temperature of an outside layer, i.e. a layer that comes into contact with a sealing means during the sealing process, so that the appearance of the outside layer will not be affected by the sealing process and the polymer will not stick to the sealing means, for example, the jaws of a sealing bar. In the multilayer structures of the invention, the outer layer may be a species of the above-described structural layers or a layer of different composition. The heat sealing layer is generally the layer that contacts the contents of a package comprising the oriented multilayer film structure of the invention. The composition of the heat sealing layer is preferably selected to have minimum effect on taste or color of the contents, to be unaffected by the product, and to withstand sealing conditions, such as the presence of liquid droplets, grease, dust, or the like.

The heat sealing layer may comprise an ethylene vinyl acetate copolymer, that is, a copolymer of monomers comprising ethylene and vinyl acetate. Ethylene vinyl acetate (EVA) copolymers are inclusive of EVA dipolymers, EVA terpolymers and higher order copolymers. The term "EVA dipolymers" describes copolymers consisting of only copolymerized units of ethylene and vinyl acetate. The term "EVA terpolymers" describes copolymers prepared by copolymerization of ethylene, vinyl acetate and an additional comonomer. Preferred examples of vinyl acetate copolymers are those wherein the weight percentage of copolymerized vinyl acetate units is from about 5 to about 35 weight % of the EVA copolymer. Copolymers having about 8 to about 20 weight % copolymerized vinyl acetate units are more preferred. EVA copolymers include those available from E.I. du Pont de Nemours and Company under the ELVAX EVA resin tradename.

For purposes of the present invention the term EVA has its usual meaning and does not include partially hydrolyzed EVA copolymers. That is, the EVA polymers contain less than 0.5 wt. % hydroxyl groups.

A mixture of two or more different EVA copolymers may be used in place of a single copolymer so long as the average values for the comonomer content will be within the range indicated above. Particularly useful properties may be obtained when two or more properly selected EVA copolymers are used.

Other polymers suitable for use in the heat sealing layer comprise ethylene alkyl acrylate copolymers or ethylene alkyl methacrylate copolymers. That is, the copolymers will comprise copolymerized units of ethylene and an alkyl acrylate or an alkyl methacrylate. Preferably, such copolymers are those wherein the alkyl group contains from one to six carbon atoms. More preferably, the alkyl group of the alkyl acrylate or alkyl methacrylate comonomer has from one to four carbon atoms. Most preferable acrylate monomers are methyl acrylate, ethyl acrylate, isobutyl acrylate and n-butyl acrylate.

The weight percentage of copolymerized units of alkyl acrylate or alkyl methacrylate comonomer present in the ethylene alkyl acrylate or ethylene alkyl methacrylate copolymer can vary broadly from a few weight % up to as high as 40 weight % of the copolymer or even higher. Preferably, the weight percentage of copolymerized units of alkyl acrylate comonomer will be from about 5 to about 35 weight %, more preferably from about 8 to about 20 weight %, based on the weight of the ethylene alkyl acrylate copolymer. Similarly, the weight percentage of copolymerized units of alkyl methacrylate comonomer will preferably be from about 5 to about 35 weight %, more preferably from about 8 to about 20 weight %, based on the weight of the ethylene alkyl methacrylate copolymer.

Ethylene alkyl acrylate copolymers include those available from E.I. du Pont de Nemours and Company under the ELVALOY AC Elvaloy® AC acrylate copolymer tradename.

A mixture of two or more different ethylene alkyl acrylate or ethylene alkyl methacrylate copolymers can be used in place of a single copolymer so long as the average values for the comonomer content will be within the range indicated above. Particularly useful properties may be obtained when two or more properly selected ethylene alkyl acrylate or ethylene alkyl methacrylate copolymers are used in the as components of the heat sealing layer in the films of the invention.

Polyethylenes suitable for use as components of the heat sealing layer include polyethylene and copolymers of ethylene and alpha-olefins, such as linear low density polyethylenes, and homopolymers or copolymers of ethylene and alpha-olefin monomers prepared in the presence of metallocene catalysts, single site catalysts and constrained geometry catalysts (hereinafter metallocene polyethylenes, or MPE).

Suitable ethylene copolymers can be prepared by a variety of methods. Examples of such processes include, but are not limited to, the well-known Ziegler-Natta catalyst polymerization (see for example U.S. Pat. No. 4,076,698 and U.S. Pat. No. 3,645,992), metallocene catalyzed polymerization, VERSIPOL single-site catalyst polymerization and free radical polymerization. As used herein, the term metallocene catalyzed polymerization includes polymerization processes that involve the use of metallocene catalysts as well as those processes that involve use of constrained geometry and single-site catalysts. Polymerization can be conducted as a solution-phase process, a gas phase-process or the like.

Without being held to any particular theory, MPE is of note because of its substantially linear structure and narrow molecular weight distribution. Metallocene technology is capable of making lower density polyethylene with high flexibility and low crystallinity. Metallocene technology is described in, for example, U.S. Pat. Nos. 5,272,236; 5,278, 272; 5,507,475; 5,264,405 and 5,240,894.

Linear polyethylenes can incorporate copolymerized units of alpha-olefin comonomers such as butene, hexene or octene. For example, a copolymer useful as the polyolefin component can comprise a major portion or percentage by weight of copolymerized units of ethylene and a minor portion or percentage by weight of copolymerized units of at least one other alpha-olefin. Suitable alpha-olefins can be selected from the group consisting of alpha-olefins having at least three carbon atoms, preferably from 3 to 20 carbon atoms. These comonomers are present as copolymerized units in an amount of up to about 20 weight % of the copolymer. Preferred alpha-olefins include propylene, 1-butene, 1-hexene, 4-methyl-1-pentene, 1-octene, 1-decene, 1-tetradecene and 1-octadecene. Copolymers can be obtained by polymerization of ethylene with two or more alpha-olefins, preferably including propylene, 1-butene, 1-octene and 4-methyl-1-pentene.

In some instances blends of polymers, especially blends of ethylene copolymers, may be useful as components of the heat sealing layer. As with the structural layer, the heat sealing layer can additionally comprise conventional additives as described herein, used in quantities that do not detract from the ability of the laminated film to shrink 25% or greater when exposed to a temperature of 85° C. for a period of at least one minute on initial exposure.

The laminated shrink films of the invention additionally comprise a gas barrier layer. The term "gas barrier layer" as used herein denotes a film layer that allows transmission through the film of less than 1000 cc of gas, such as oxygen, per square meter of film per 24 hour period at 1 atmosphere and at a temperature of 73° F. (23° C.) at 50% relative humidity. Other polymers may be present as additional components in the barrier layer so long as they do not raise the permeability of the barrier layer above the limit defined above. The gas barrier layer of the multilayer laminated heat shrinkable films of the invention comprises ethylene vinyl alcohol polymers (EVOH) and mixtures thereof.

EVOH polymers generally have an ethylene content of between about 15 mole percent to about 60 mole percent, more preferably between about 20 to about 50 mole percent. The density of commercially available EVOH generally ranges from between about 1.12 g/cm$^3$ to about 1.20 gm/cm$^3$, the polymers having a melting temperature ranging from between about 142° C. and 191° C. EVOH polymers can be prepared by well-known techniques or can be obtained from commercial sources. EVOH copolymers may be prepared by saponifying or hydrolyzing ethylene vinyl acetate copolymers. Thus EVOH may also be known as hydrolyzed ethylene vinyl acetate (HEVA) copolymer. The degree of hydrolysis is preferably from about 50 to 100 mole percent, more preferably from about 85 to 100 mole percent. In addition, the weight average molecular weight, $M_w$, of the EVOH component useful in the laminates of the invention, calculated from the degree of polymerization and the molecular weight of the repeating unit, may be within the range of about 5,000 Daltons to about 300,000 Daltons with about 60,000 Daltons being most preferred.

Suitable EVOH polymers may be obtained from Eval Company of America or Kuraray Company of Japan under the tradename EVAL ethylene vinyl alcohol copolymer resin. EVOH is also available under the tradename SOARNOL ethylene-vinyl alcohol copolymer from Noltex L.L.C. Examples of such EVOH resins include EVAL F101, EVAL E105, EVAL J102, and SOARNOL DT2903, SOARNOL DC3203 and SOARNOL ET3803. Preferably the EVOH used in the invention is orientable from about 3×3 to about 10×10 stretch without loss in barrier properties from pinholing, necking or breaks in the EVOH layer.

Of special note are EVOH resins sold under the tradename EVAL SP obtained from Eval Company of America or Kuraray Company of Japan that may be useful as components in the laminated shrink films of the present invention. EVAL SP is a type of EVOH that exhibits enhanced plasticity and that is suited for use in packaging applications including shrink film, polyethylene terephthalate (PET)-type barrier bottles and deep-draw cups and trays. Examples of such EVOH resins include EVAL SP 521, EVAL SP 292 and EVAL SP 482. The EVAL SP grades of EVOH are easier to orient than the conventional EVAL resins. These EVOH polymers are a preferred class for use in the multilayer oriented heat shrinkable film compositions and shrinkbags of the present invention. Without being bound to theory, it is believed that the enhanced orientability of the EVAL SP EVOH resins derives from their chemical structure, in particular the level of head to head adjacent hydroxyl groups in the EVOH polymer chain. By head to head adjacent hydroxyl groups is meant 1,2-glycol structural units.

It has been found that EVOH polymers having a relatively high level of 1,2-glycol units in the EVOH polymer chain are particularly suited for use in the multilayer oriented heat shrinkable film compositions and shrinkbags of the present invention. By relatively high is meant from about 2 to about 8 mol % 1,2-glycol structural units are present in the EVOH polymer chain. Preferably, about 2.8 to about 5.2 mol % 1,2-glycol units will be present.

Such polymers can be produced by increasing the amount of adjacent copolymerized units of vinyl acetate produced during polymerization of ethylene and vinyl acetate above the level generally used. When such polymers are hydrolyzed to form EVOH, an increased amount of head-to-head vinyl alcohol adjacency, that is, an increased amount of the 1,2-glycol structure result. It has been reported in the case of polyvinyl alcohol that the presence of the 1,2-glycol structure in polyvinyl alcohol can influence the degree of crystallinity obtained in these alcohols and thereby the tensile strength. See, for example F. L. Marten & C. W. Zvanut, Chapter 2 *Manufacture of Polyvinyl Acetate for Polyvinyl Alcohol*, Polyvinyl Alcohol Developments (C. A. Finch ed.) John Wiley, New York 1992.

The more orientable grades of EVOH will generally have lower yield strength, lower tensile strength and lower rates of strain hardening than other EVOH polymers of equivalent ethylene content, as measured by mol % ethylene.

The level of 1,2-glycol units present in the EVOH may be determined by structural analysis using proton nuclear magnetic resonance (NMR) according to the following experimental procedure.

A 1H NMR spectrum is obtained using a Bruker Avance 500 MHz spectrometer with a 5 mm BBIz probe (broad band inverse probe with a z gradient, Model number SN 228). 15 mg of sample is dissolved DMSO-d6, a deuterated dimethyl sulphoxide. The spectrum is obtained using the following parameters: 90 degree pulse at 8.32 microseconds; recycle delay at 30 second; acquisition time at 4.68 seconds; spectral width: 8 KHz; number of scans: 16.

In order to resolve the resonances that correspond to the adjacent hydroxyl groups a nmr spectrum of the sample is obtained at 100° C. The resonance at 3.3 ppm represents methine protons from —CH(OH)—(OH)CH— head-to-head segments (1,2-glycols) The spectra are referenced to the DMSO-d6 peak at 2.49 ppm. The 3.3 ppm integrated resonance is divided by the integrated resonances between 3.1 ppm and 4.6 ppm (the vinylic hydroxyl ("VOH") resonances) and multiplied by 100% to provide the mol % of 1,2-glycol in the ethylene vinyl alcohol polymer.

The EVOH composition may optionally be modified by including additional polymeric materials selected from the group consisting of polyamides, including amorphous polyamides, ionomers, and ethylene polymers and mixtures thereof: These modifying polymers may be present in amounts up to 30 weight % of the EVOH composition.

Polyamides (e.g. nylon) suitable for use are generally prepared by polymerization of lactams or amino acids (e.g. nylon 6 or nylon 11), or by condensation of diamines such as hexamethylene diamine with dibasic acids such as succinic, adipic, or sebacic acid. The polyamides may also include copolymerized units of additional comonomers to form terpolymers or higher order polymers. The polyamide can include nylon 6, nylon 9, nylon 10, nylon 11, nylon 12, nylon 6,6, nylon 6,10, nylon 6,12, nylon 6I, nylon 6T, nylon 6.9, nylon 12,12, copolymers thereof and blends of amorphous and semicrystalline polyamides. As used herein the term polyamide also includes polyamide nano-composites such as those available commercially under the tradename AEGIS polyamides from Honeywell International Inc. or IMPERM polyamide (nylon MXD6) from Mitsubishi Gas Chemical Company.

Preferred polyamides include polyepsiloncaprolactam (nylon 6); polyhexamethylene adipamide (nylon 6,6); nylon 11; nylon 12, nylon 12,12 and copolymers and terpolymers such as nylon 6/6,6; nylon 6,10; nylon 6,12; nylon 6,6/12; nylon 6/6, and nylon 6/6T. More preferred polyamides are polyepsiloncaprolactam (nylon 6), polyhexamethylene adipamide (nylon 6,6), and most preferred is nylon 6. Although these polyamides are preferred polyamides, other polyamides, such as amorphous polyamides, are also suitable for use. Amorphous polyamides include amorphous nylon 6I, 6T available from E.I. du Pont de Nemours and Company under the tradename SELAR PA. Other amorphous polyamides include those described in U.S. Pat. Nos. 5,053,259; 5,344,679 and 5,480,945. Additional useful polyamides include those described in U.S. Pat. Nos. 5,408,000; 4,174,358; 3,393,210; 2,512,606; 2,312,966 and 2,241,322.

The polymer compositions of the barrier layer can additionally comprise conventional additives used in polymeric materials including those described for use in the structural and heat sealing layers of the multilayer films of the invention.

The heat shrinkable films of the invention may comprise more than one of the above-described layers. That is, the films may comprise additional structural layers, heat sealing layers or gas barrier layers. In addition, any of the additional layers may comprise conventional additives as described herein, used in quantities that do not detract from the ability of the laminated film to shrink 25% or greater when exposed to a temperature of 85° C. for a period of at least one minute The additives in each layer may be the same or different.

In certain embodiments, the multilayer heat shrinkable films of the invention may comprise at least one adhesive layer, positioned between any of the other layers, for example between a structural layer and a heat sealing layer or between a gas barrier layer and a heat sealing layer. The adhesive layer will be compositionally distinct the from the heat sealing layer. By compositionally distinct is meant that the number of components, the ratio of components or the chemical structure (for example, monomer ratio of polymeric components having the same monomers) of the components comprising the heat seal layer and the adhesive layer, will differ. For example, adhesive compositions described in U.S. Pat. Nos. 6,545,091, 5,217,812, 5,053,457, 6,166,142, 6,210,765 and U.S. patent application Ser. No. 11/644,976 are useful in this invention.

A preferred adhesive useful in the multilayer film of the invention is a multicomponent composition comprising 1) a functionalized polymer, 2) an ethylene copolymer, and 3) a tackifier. These adhesive compositions are particularly suitable for use as an adhesive or tie layer in multilayer laminated shrink films, especially those that require a high degree of shrink. The adhesive compositions provide suitable adhesion between the various layers of the laminate film and provide improved adhesion in biaxially oriented films.

The functionalized polymers useful as component 1) of the preferred multicomponent adhesive composition comprise anhydride-modified polymers and copolymers comprising copolymerized units of ethylene and a comonomer selected from the group consisting of $C_4$-$C_8$ unsaturated acids having at least two carboxylic acid groups, and cyclic anhydrides, monoesters and diesters of such acids. Mixtures of these components are also useful. The ethylene copolymers useful as component 2) of the adhesive comprise at least one ethylene copolymer, chemically distinct from the functionalized polymer that is the component 1) polymer composition. By chemically distinct is meant that a) the ethylene copolymer of the second component of the adhesive comprises at least one species of copolymerized monomer that is not present as a comonomer in the functionalized polymer component or b) the functionalized polymer component of the adhesive comprises at least one species of copolymerized monomer that is not present in the ethylene copolymer of the second component of the adhesive or c) the ethylene copolymer that is the second component of the adhesive is not an anhydride-grafted or functionalized ethylene copolymer as defined above. Thus, the first and second polymers are different in chemical structure and are distinct polymer species.

Anhydride-modified polymers that are suitable for use as functionalized polymer components of the preferred adhesive composition are anhydride-grafted homopolymers or copolymers. These include polymers that have been grafted with from 0.1 to 10 weight % of an unsaturated dicarboxylic acid anhydride. Generally, they will be grafted olefin polymers, for example grafted polyethylene, grafted EVA copolymers, grafted ethylene alkyl acrylate copolymers and grafted ethylene alkyl methacrylate copolymers. Specific examples of suitable anhydride-modified polymers are disclosed co-pending U.S. patent application Ser. No. 11/644,976.

The functionalized polymer may also be an ethylene copolymer comprising copolymerized units of ethylene and a comonomer selected from the group consisting of $C_4$-$C_8$ unsaturated anhydrides, monoesters of $C_4$-$C_8$ unsaturated acids having at least two carboxylic acid groups, diesters of $C_4$-$C_8$ unsaturated acids having at least two carboxylic acid groups and mixtures of such copolymers. The ethylene copolymer may comprise from about 3 to about 25 weight % of copolymerized units of the comonomer. The copolymer may be a dipolymer or a higher order copolymer, such as a terpolymer or tetrapolymer. The copolymers are preferably random copolymers. Examples of suitable comonomers of the ethylene copolymer include unsaturated anhydrides such as maleic anhydride and itaconic anhydride; $C_1$-$C_{20}$ alkyl monoesters of butenedioic acids (e.g. maleic acid, fumaric acid, itaconic acid and citraconic acid), including methyl hydrogen maleate, ethyl hydrogen maleate, propyl hydrogen fumarate, and 2-ethylhexyl hydrogen fumarate; $C_1$-$C_{20}$ alkyl diesters of butenedioic acids such as dimethylmaleate, diethylmaleate, and dibutylcitraconate, dioctylmaleate, and di-2-ethylhexylfumarate. These functionalized polymer components of the adhesive composition are ethylene copolymers obtained by a process of high-pressure free radical random copolymerization, rather than graft copolymers. The monomer units are incorporated into the polymer backbone or chain and are not incorporated to an appreciable extent as pendant groups onto a previously formed polymer backbone.

The second component of the preferred adhesive composition is at least one ethylene copolymer compositionally distinct from the first functionalized polymer component. Ethylene copolymers used as the second component of the adhesive composition may be copolymers of ethylene and alpha-olefins, including copolymers with propylene and other alpha-olefins. Ethylene copolymers suitable for use as the second component include high density polyethylenes, low density polyethylenes, very low density polyethylenes (VLDPE), linear low density polyethylenes, and copolymers of ethylene and alpha-olefin monomers prepared in the presence of metallocene catalysts, single site catalysts and constrained geometry catalysts (hereinafter referred to as metallocene polyethylenes, or MPE). Suitable ethylene copolymers and methods for their preparation are disclosed in co-pending U.S. patent application Ser. No. 11/644,976. The ethylene copolymer used as the second component of the adhesive composition may also comprise copolymerized units of ethylene and a polar comonomer selected from the group consisting of vinyl acetate, alkyl acrylates, alkyl methacrylates and mixtures thereof. The alkyl groups will have from 1 to 10 carbon atoms. Additional comonomers may be incorporated as copolymerized units in the ethylene copolymer. Suitable copolymerizable monomers include carbon monoxide, methacrylic acid and acrylic acid. Ethylene alkyl acrylate carbon monoxide terpolymers are examples of such compositions, including ethylene n-butyl acrylate carbon monoxide terpolymers.

The ethylene copolymer of the second component may also be an ethylene alkyl acrylate or ethylene alkyl methacrylate copolymer. Alkyl acrylates and alkyl methacrylates may have alkyl groups of 1 to 10 carbon atoms, for example methyl, ethyl or butyl groups. The relative amount of the alkyl acrylate or alkyl methacrylate comonomer units in the copolymers can vary broadly from a few weight percent to as much as 45 weight percent, based on the weight of the copolymer. Mixtures of ethylene alkyl acrylate and/or alkyl methacrylate copolymers may also be used.

The adhesive composition may also include a tackifier. The presence of tackifier facilitates bond adhesion when the film is oriented and later shrunk. The tackifier may be any suitable tackifier known generally in the art. For example, the tackifier may include types listed in U.S. Pat. No. 3,484,405. Suitable tackifiers include a variety of natural and synthetic resins and rosin materials. Tackifier resins that can be employed are liquid, semi-solid to solid, complex amorphous materials generally in the form of mixtures of organic compounds having no definite melting point and no tendency to crystallize. These include coumarone-indene resins, such as the para-coumarone-indene resins, terpene resins, including styrenated terpenes, butadiene-styrene resins having molecular weights ranging from about 500 to about 5,000, polybutadiene resins having molecular weights ranging from about 500 to about 5,000, hydrocarbon resins produced by catalytic polymerization of fractions obtained in the refining of petroleum, having a molecular weight range of about 500 to about 5,000, polybutenes obtained from the polymerization of isobutylene, hydrogenated hydrocarbon resins, rosin materials, low molecular weight styrene hard resins or disproportionated pentaerythritol esters, aromatic tackifiers, including thermoplastic hydrocarbon resins derived from styrene, alpha-methylstyrene, and/or vinyltoluene, and polymers, copolymers and terpolymers thereof, terpenes, terpene phenolics, modified terpenes, and combinations thereof. These latter materials may be further hydrogenated in part or in entirety to produce alicyclic tackifiers. A more comprehensive listing of tackifiers that can be employed in this invention is provided in TAPPI CA Report #55, Technical Association of the Pulp and Paper Industry, 1975, pp 13-20, which lists over 200 commercially available tackifier resins.

The adhesive compositions may additionally include various commonly used additives and fillers such as described above for use in the barrier layer of the laminate. Some particularly useful additives may include antioxidants, antistatic additives and antifog additives. The adhesive composition may also include additional polymeric materials.

The multilayer heat shrinkable film may comprise additional layers. One or more of these additional layers may be disposed between or external to a structural layer, barrier layer or heat seal layer. For example, additional layers may be disposed between the barrier layer and heat seal layer. They may also be disposed, for example, adjacent to and in contact with a face of a structural layer. Similarly, at least one additional layer may be disposed between a barrier layer and a heat seal layer. For example, the multilayer shrinkable film may include one or more additional layers adhered to the outer face of the structural layer, either directly or through intervening adhesive layers. In some structures, the structural layer may be adjacent to and in contact with the barrier layer. In other embodiments, the heat seal layer will be adjacent to and in contact with the barrier layer. The selection of additional internal or external layers will depend upon the strength, sealing and aesthetic properties desired in the particular embodiment as well as the cost and complexity of manufacture.

Any laminate of the invention will include a structural layer, barrier layer and heat sealing layer as described herein. In some embodiments, the multilayer shrink films of the invention may have three to nine layers, comprising one or more adhesive, or "tie", layers. Other structures having a greater number of layers are also contemplated.

Representative examples of multilayer films of the invention include those described below. Where an adhesive layer is present, that layer is designated as "tie." In the multilayer film structures the symbol "/" represents a boundary between layers. In these structures, outside to inside layers of the multilayer structure as intended to be used in a package are listed in order from left to right. The structures below are not meant to be an exhaustive list of the structures of the invention and are for purposes of example. Those skilled in the art will recognize that other film structures will fall within the scope of the invention. Such structures may include one or more adhesive layers. The adhesive may be any adhesive composition, including the above-described preferred adhesive compositions. Each embodiment will have particular advantages depending on the particular packaging application.

Ethylene acrylic acid ionomer/EVOH/polyethylene;
Ethylene acrylic acid ionomer/EVOH/ethylene vinyl acetate;
Ethylene methacrylic acid ionomer/tie/EVOH/tie/ethylene alkyl acrylate;
Ethylene methacrylic acid ionomer/EVOH/ethylene alkyl methacrylate;
Ethylene methacrylic acid ionomer/tie/EVOH/tie/ethylene vinyl acetate
Polyester/EVOH/polyethylene;
Polyester/tie/EVOH/tie/ethylene vinyl acetate;
Polyester/EVOH/ethylene alkyl acrylate;
Polyester/tie/EVOH/tie/ethylene alkyl methacrylate;
Ethylene acrylic acid/EVOH/polyethylene;
Ethylene acrylic acid/EVOH/ethylene vinyl acetate;
Ethylene methacrylic acid/tie/EVOH/tie/ethylene alkyl acrylate;
Ethylene methacrylic acid/EVOH/ethylene alkyl methacrylate;
Ethylene acrylic acid ionomer/ethylene acrylic acid ionomer/tie/EVOH/tie/ethylene vinyl acetate;
Ethylene acrylic acid ionomer/ethylene acrylic acid/tie/EVOH/tie/ethylene alkyl acrylate;
Ethylene acrylic acid/ethylene acrylic acid ionomer/tie/EVOH/tie/ethylene vinyl acetate;
Ethylene methacrylic acid/ethylene methacrylic acid/tie/EVOH/tie/ethylene alkyl acrylate;
Polyester/tie/EVOH/tie/ethylene alkyl methacrylate;
Ethylene acrylic acid ionomer/tie/Ionomer/tie/EVOH/tie/polyethylene;
Ethylene acrylic acid ionomer/tie/EVOH/tie/ethylene vinyl acetate;
Ethylene acrylic acid ionomer/tie/EVOH/tie/polyethylene;
Ethylene methacrylic acid/tie/EVOH/tie/ethylene vinyl acetate; and
Ethylene acrylic acid/tie/EVOH/tie/polyethylene.

The multilayer heat shrinkable films of the invention are oriented to provide shrinkability. The temperature selected for orienting a film can depend on many factors, including the compositional type and number of film layers being oriented, the melt indices of the components of the film, the stretching forces applied to the film during the orientation process, the speed of the film production line, and/or the degree of stretching desired. The invention is not limited by any example; however many conventional orientation processes can be conducted within a range of from about 70° C. to about 125° C. Any individual temperature within this range can be useful in orienting a film for use in shrink applications, depending on at least some of the factors listed herein. Many preferred conventional orientation processes are carried out within a temperature range of from about 80° C. to about 100° C.

The laminate can be manufactured by laminating individual layers, preferably by extrusion coating, coextrusion or blow molding. Although the thickness of the laminate is arbitrary and dependent on its application, it is preferably from about 10 to about 3000 µm, and in particular, from about 20 to about 1000 µm, for example.

The laminate may optionally be irradiated by processes known in the art. This may be accomplished by irradiation prior, during or subsequent to orientation. For example, irradiation dosage may be from about 1 mRad to about 10 mRad, or from 2 to 5 mRad. Stretchability, heat resistance and mechanical strength can be improved with irradiation.

A multilayer film can be prepared by coextrusion as follows: granulates of the various components are melted in suitable extruders and converted into a film using a converting technique. For coextrusion, the molten polymers are passed through a die or set of dies to form layers of molten polymers that are processed as a layered flow and then cooled to form a layered structure. The film may also be prepared by coextrusion followed by lamination onto one or more other layers. Suitable converting techniques include blown film extrusion, cast film extrusion, cast sheet extrusion and extrusion coating. A preferred film is a blown film obtained through blown film extrusion.

The film is further oriented beyond the immediate quenching or casting of the film. In general terms the process comprises the steps of coextruding a multilayer flow of molten polymers, quenching the coextrudate and orienting the quenched coextrudate in at least one direction. The film may be uniaxially oriented, but is preferably biaxially oriented by drawing in two mutually perpendicular directions in the plane of the film to achieve a satisfactory combination of mechanical and physical properties.

Orientation and stretching apparatus to uniaxially or biaxially stretch film are known in the art and may be adapted by those skilled in the art to produce the films. Examples of such apparatus and processes include e.g. those disclosed in U.S. Pat. Nos. 3,278,663; 3,337,665; 3,456,044; 4,590,106; 4,760,116; 4,769,421; 4,797,235 and 4,886,634.

Orientation of multilayer films is generally carried out on a commercial scale using tenterframe or double bubble tubular processes conducted at temperatures below the melting point of at least one of the polymers present in the multilayer film. Machine manufacturers employing the double bubble tubular process technology include Kuhne Anlagenbau, Macro Engineering & Technology, and Plamex Maschinenbau.

In a preferred embodiment, the multilayer film is oriented through a double bubble extrusion process, where simultaneous biaxial orientation may be effected by extruding a primary multilayer film tube which is subsequently quenched, reheated and then expanded by internal gas pressure to induce transverse orientation, and drawn by differential speed nip or conveying rollers at a rate which will induce longitudinal orientation. More particularly, a primary tube is melt extruded from an annular die. This extruded primary tube is cooled quickly to minimize crystallization and then collapsed. It is then again heated to its orientation temperature (e.g. by means of a water bath). In the orientation zone a secondary tube is formed by inflation, thereby radially expanding the film in the transverse direction, and the tube is pulled or stretched in the machine direction at a temperature such that expansion occurs in both directions, preferably simultaneously; the expansion of the tubing being accompanied by a sharp, sudden reduction of thickness at the draw point. The tubular film can then again be flattened through nip rolls. Flat films can be prepared by splitting the tubular film along its length and opened up into flat sheets that can be rolled and/or further processed.

Preferably, the film can be processed on the manufacturing machine at a speed higher than 50 meters per minute (m/min), and up to a speed of 200 m/min. The film is therefore compatible with high-speed machines.

The tubular film may also be processed into shrink bags by forming seals (for example, by heat-sealing or radio-frequency welding) across the tube surface and cutting the sealed tube into lengths, thereby providing tubes with one closed end and one open end. Materials to be packaged can be inserted into the tubes through the open end and then sealed to form filled shrink bags by sealing the open ends of the tubes. In some cases, the operations of forming the shrink bag, filling and sealing can be carried out consecutively and/or simultaneously using automated machinery.

The heat shrinkable multilayer films of the invention are characterized by the ability to shrink to a size that is at least 25% less than their original dimension on initial exposure to a temperature of 85° C. Preferable films of the invention have the ability to shrink to a size that is at least 30% less than their original dimension on exposure to 85° C. Some examples of films of the invention particularly adapted to food packaging shrink film applications include films of the following structures Ethylene methacrylic acid ionomer/tie/EVOH/tie/Ethylene vinyl acetate Ethylene methacrylic acid ionomer/tie/EVOH/metallocene polyethylene The multilayer heat shrinkable films of the invention are particularly useful in packaging applications and may be used as in packaging of for example primal beef cuts, boneless pork loins, marinated pork and beef cuts, smoked cheeses, soft cheeses and hard cheeses. The films may be formed into shrinkbags or other articles, including shrink lidding, shrink sleeves and shrink wraps. When the films are formed into shrinkbags, the shrink performance of the bags is excellent and in the same range as PVDC bags. At 95° C., they shrinkbags of the invention may achieve higher shrink values than PVDC bags. Shrinkage of bags of the invention is commonly as high as 60%. The shrink properties are stable after periods of 32 weeks aging, indicating continued high shrink values. These shrink values are very high in comparison to those of nylon-containing shrinkbags. Shrinkbags of this invention routinely exhibit from 45% to 62% shrink at 95° C., whereas nylon-based shrinkbags range often exhibit only from approximately 20-30% shrink under similar conditions. In some instances, the 85° C. shrink exhibited by compositions of the invention, is higher than the shrink values of nylon-based bags at the higher shrink temperature of 95° C.

The invention is further illustrated by the specific embodiments disclosed in the following Examples.

EXAMPLES

Materials

SURLYN 1901 synthetic resin: ethylene/methacrylic acid sodium ionomer, melt flow rate (1.3 g/10 minutes (190° C., 2.16 kg. load), melt point 95° C., freeze point 54° C., Vicat softening point 70° C., available from DuPont.

SURLYN 1601 synthetic resin: ethylene/methacrylic acid sodium ionomer, melt flow rate 1.3 g/10 minutes (190° C., 2.16 kg), melt point 98° C., freeze point 68° C., Vicat softening point 74° C., available from DuPont.

ELVAX 3135X EVA resin: Ethylene vinyl acetate dipolymer (12 weight % vinyl acetate), melt flow rate 0.35 g/10 minutes (190° C., 2.16 kg load), density 0.93 g/cc, available from DuPont.

EVAL SP 292 ethylene vinyl alcohol copolymer resin: Ethylene vinyl alcohol copolymer melt flow rate 4.4 g/10 minutes (measured in accordance with ASTM D-1238, 210° C., 2.16 kg weight), melt point 191° C., available from Eval Company of America.

EVAL SP 521 ethylene vinyl alcohol copolymer resin: Ethylene vinyl alcohol copolymer melt flow rate 4.0 g/10 minutes (measured in accordance with ASTM D-1238, 210° C., 2.16 kg weight), melt point 165° C., available from Eval Company of America.

BYNEL 21 E787 Adhesive resin: an ethylene methyl acrylate maleic anhydride graft copolymer adhesive composition, density 0.930 g/cc; melt flow rate 1.6 g/10 minutes (190° C., 2.16 kg load); melt point 94° C., freeze point 76° C., Vicat softening point 54° C., available from DuPont.

Test Procedures

Oxygen transmission rate (OTR): ASTM D3985.
Moisture vapor transmission rate (MVTR): ASTM F1249.
Secant modulus: ASTM D882.

Examples 1-3 and Comparative Examples

Shrinkbags were formed from five-layer heat shrinkable oriented films of the invention on a double bubble extrusion line. The bags were not irradiated after production. The structures of the multilayer films are summarized in Table 1 where the layers are listed in order from outside (first) to inside (last). The percentage of 1,2-glycol units in the EVOH polymers utilized in the structures was determined by nmr analysis as described herein and was found to be 4.5 mol % 1,2-glycol units for EVAL SP 292 and 3.1 mol % 1,2-glycol units for EVAL SP 521.

TABLE 1

|  | Structure | Layer Composition | Thickness (microns) |
|---|---|---|---|
| Example 1 | Structural Layer | SURLYN 1901 | 28 |
|  | Tie Layer | BYNEL 21E787 | 3 |
|  | Barrier Layer | EVAL SP 292 | 3 |
|  | Tie Layer | BYNEL 21E787 | 5 |
|  | Heat Seal Layer | ELVAX 3135X | 19 |
|  | Total Gauge |  | 57 |
| Example 2 | Structural Layer | SURLYN 1601 | 28 |
|  | Tie Layer | BYNEL 21E787 | 3 |
|  | Barrier Layer | 1:1 blend of EVAL SP 521 and EVAL SP 292(?) | 3 |
|  | Tie Layer | BYNEL 21E787 | 5 |
|  | Heat Seal Layer | ELVAX 3135X | 20 |
|  | Total Gauge |  | 58 |
| Example 3 | Structural Layer | SURLYN 1601 | 30 |
|  | Tie Layer | BYNEL 21E787 | 4 |
|  | Barrier Layer | EVAL SP 521 | 3 |
|  | Tie Layer | BYNEL 21E787 | 3 |
|  | Heat Seal Layer | ELVAX 3135X | 17 |

Five types of commercially available PVDC-containing shrink bags were obtained. These comparative samples are designated PVDC-1, PVDC-2, PVDC-3, PVDC-4 and PVDC-5. Microscopic and infrared analysis of the comparative samples provided the composition and structure information shown in Table 2. Also for comparison, three multi-layer commercially-available polyamide (nylon)-containing shrinkbags, designated PA-1, PA-2, and PA-3, were obtained. Microscopic and infra-red analysis of these bags provided the composition and structure information in Table 2A.

TABLE 2

| Structure | PVDC-1 | | PVDC-2 | | PVDC-3 | |
|---|---|---|---|---|---|---|
| | Layer composition | Thickness (microns) | Layer Composition | Thickness (microns) | Layer composition | Thickness (microns) |
| Outside Layer | EVA | 25 | EVA | 15 | EVA | 14 |
| | PVDC | 10 | PVDC | 10 | PVDC | 6 |
| Inside Layer | EVA | 53 | EVA | 28 | EVA | 38 |
| Total Gauge | | 84 | | 58 | | 58 |

| Structure | PVDC-4 | | PVDC-5 | |
|---|---|---|---|---|
| | Layer composition | Thickness (microns) | Layer composition | Thickness (microns) |
| Outside Layer | EVA | 11 | EVA | 21 |
| | PVDC | 6 | PVDC | 4 |
| | EVA | 32 | EVA | 25 |
| Inside Layer | PE | 6 | PE | 8 |
| Total Gauge | | 55 | | 58 |

TABLE 2A

| Structure | PA-1 | | PA-2 | | PA-3 | |
|---|---|---|---|---|---|---|
| | Layer composition | Thickness (microns) | Layer Composition | Thickness (microns) | Layer composition | Thickness (microns) |
| Outside Layer | PE | 10 | EVA | 15 | EVA | 12 |
| | Tie | 8 | Tie | 5 | Tie | 4 |
| | Nylon | 25 | Nylon | 13 | Nylon | 28 |
| | Tie | 5 | Tie | 8 | Tie | 4 |
| Inside Layer | Zinc ionomer | 18 | EVA | 25 | EVA | 10 |
| Total Gauge | | 66 | | 66 | | 58 |

Properties of the bags from Examples 1-3 and Comparative samples PVDC-through PVDC-5 and PA-1 through PA-3 are summarized in Tables 3 and 4.

Table 3 summarizes the comparison of the shrink properties and elastic modulus of Examples 1-3 in comparison to the 5 PVDC samples and the PA-samples. Shrink properties were measured by placing 101 mm×101 mm squares of film, with the machine direction (MD) and transverse direction (TD) of the films marked, into a waterbath maintained at 85° C. or 95° C. for 2 minutes, and then measuring the new dimensions. The % shrink is calculated as the absolute value obtained from the formula $[(L_1-L_0)/L_0]\times100$, where $L_1$ is the dimension in the machine or transverse directions after shrink, and $L_0$ is the dimension in the machine or transverse directions of the original film. In Table 3, "NA" represents "not available". The ages of the PVDC samples and the PA samples are unknown, but the time required between the date the samples were obtained, sent to the test laboratory, and analyzed would typically be greater than 4 weeks. Therefore, the age of these samples was, at a minimum, four weeks after shrink.

TABLE 3

| Shrink Bag ID | Age (weeks) | % Shrink at 85° C. MD | % Shrink at 85° C. TD | % Shrink 95° C. MD | % Shrink 95° C. TD | Secant Modulus, MPa MD | Secant Modulus, MPa TD |
|---|---|---|---|---|---|---|---|
| Example 1 | 2 | 34 ± 3 | 50 ± 5 | 57 ± 3 | 45 ± 9 | 212 ± 15 | 207 ± 21 |
|  | 4 | 38 ± 5 | 48 ± 2 | 58 ± 3 | 50 ± 9 |  |  |
|  | 10 | 40 ± 2 | 49 ± 2 | NA | NA |  |  |
|  | 32 | 43 ± 4 | 48 ± 6 | 59 ± 5 | 55 ± 1 |  |  |
| Example 2 | 2 | 38 ± 2 | 47 ± 1 | 57 ± 1 | 50 ± 4 | 268 ± 20 | 211 ± 34 |
|  | 4 | 41 ± 1 | 42 ± 3 | 56 ± 2 | 52 ± 2 |  |  |
|  | 10 | 42 ± 1 | 43 ± 3 | NA | NA |  |  |
|  | 32 | 46 ± 3 | 51 ± 4 | 62 ± 2 | 55 ± 1 |  |  |
| Example 3 | 2 | 34 ± 9 | 37 ± 11 | 58 ± 4 | 52 ± 6 | 228 ± 14 | 206 ± 20 |
|  | 4 | 46 ± 3 | 41 ± 2 | 60 ± 2 | 51 ± 6 |  |  |
|  | 10 | 41 ± 1 | 40 ± 3 | NA | NA |  |  |
|  | 32 | 46 ± 3 | 50 ± 5 | 59 ± 4 | 58 ± 4 |  |  |
| PVDC-1 | >4 | 36 ± 0 | 45 ± 1 | 49 ± 1 | 53 ± 1 | 275 ± 27 | 301 ± 13 |
| PVDC-2 | >4 | 32 ± 4 | 37 ± 3 | 50 ± 1 | 53 ± 3 | 301 ± 74 | 347 ± 28 |
| PVDC-3 | >4 | 38 ± 1 | 39 ± 1 | 57 ± 2 | 53 ± 1 | 248 ± 16 | 257 ± 17 |
| PVDC-4 | >4 | 26 ± 1 | 45 ± 1 | 49 ± 2 | 63 ± 4 | 147 ± 2 | 137 ± 6 |
| PVDC-5 | >4 | 20 ± 1 | 34 ± 1 | 36 ± 3 | 49 ± 3 | 254 ± 49 | 265 ± 40 |
| PA-1 | >4 | 21 ± 0 | 18 ± 1 | 25 ± 2 | 21 ± 4 | 514 ± 97 | NA |
| PA-2 | >4 | 26 ± 2 | 30 ± 1 | 26 ± 3 | 30 ± 6 | 243 ± 6 | 223 ± 7 |
| PA-3 | >4 | 25 ± 1 | 26 ± 4 | 31 ± NA | 31 ± 1 | 758 ± 110 | 731 ± 55 |

The secant moduli of the examples of the invention ranged from 206 to 268 megaPascals (MPa), and fall within the range of secant moduli of the PVDC comparative samples of 137 to 301 MPa. The PA comparative samples were extremely stiff, with secant moduli in the range of 223 to 758 MPa.

Table 4 summarizes the comparison of the barrier properties of Examples 1-3 to those the PVDC comparative samples.

TABLE 4

| | Barrier | | | |
|---|---|---|---|---|
| | OTR cc/m²-day-atm O₂ | | CO₂TR | WVTR g/m²-day |
| Example | 23° C., 50% RH | 23° C., 80% RH | cc/m²-day-atm CO₂ 23° C., 50% RH | 23° C., 50% RH |
| 1 | 28 | 33 | 159 | 20 |
| 2 | 10 | 26 | 90 | 17 |
| 3 | 10 | 16 | 58 | 20 |
| PVDC-1 | 15 | ND | ND | ND |
| PVDC-2 | 25 | ND | ND | ND |
| PVDC-4 | 13 | ND | ND | 6 |
| PVDC-5 | 8 | ND | ND | 6 |
| PA-1 | 15 | ND | ND | ND |
| PA-3 | 15 | BD | 23 | 23 |

Where ND indicates not determined and RH is relative humidity

Table 5 summarizes the hot tack strength and heat seal strength of Examples 1-3. Heat seal strength was measured on a Sentinel heat sealer model #12ASL with ⅛-inch seal bars for 0.5 seconds dwell at 60 psi. The average of three heat seals per temperature is reported. Hot tack tests were conducted on a Lako Vool Model # SL-10 hot tack machine at 0.5 second dwell, 40 psi with a 0.2 second delay before the seal was pulled. An average of 5 samples per temperature is reported.

TABLE 5

| Seal Temperature ° C. | Example 1 Average | Example 1 SD | Example 2 Average | Example 2 SD | Example 3 Average | Example 3 SD |
|---|---|---|---|---|---|---|
| Peak Heat Seal, gm/25 mm | | | | | | |
| 90 | 0 |  | 0 |  | 1307 | 649 |
| 100 | 1648 | 602 | 3477 | 314 | 4728 | 391 |
| 110 | 4038 | 147 | 4189 | 119 | 4880 | 47 |
| 120 | 4984 | 442 | 4716 | 1138 | 4768 | 515 |
| 130 | 4995 | 717 | 5902 | 350 | 5299 | 609 |
| 140 | 5008 | 6 | 5837 | 461 | 5271 | 237 |
| Hot tack, N/25 mm | | | | | | |
| 80 | 1.1 | 0.18 | 1.0 | 0.10 | 0.9 | 0.22 |
| 90 | 1.4 | 0.17 | 1.6 | 0.04 | 0.9 | 0.08 |
| 100 | 3.4 | 0.14 | 3.7 | 0.10 | 2.3 | 0.27 |

TABLE 5-continued

| Seal Temperature | Example 1 | | Example 2 | | Example 3 | |
|---|---|---|---|---|---|---|
| °C. | Average | SD | Average | SD | Average | SD |
| 110 | 2.2 | 0.17 | 2.1 | 0.15 | 1.6 | 0.27 |
| 130 | | | 1.1 | 0.15 | 0.9 | 0.03 |

What is claimed is:

1. A multilayer oriented heat shrinkable film consisting essentially of:
   A) a structural layer comprising a polymer selected from the group consisting of copolymers of ethylene and a $C_3$ to $C_8$ α,β-ethylenically unsaturated carboxylic acid, ionomers of said copolymers, polyesters, and blends thereof;
   B) a heat sealing layer consisting essentially of a polymer selected from the group consisting of ethylene vinyl acetate copolymers, ethylene alkyl acrylate copolymers, ethylene alkyl methacrylate copolymers, polyethylene, and blends thereof; and
   C) a gas barrier layer consisting essentially of at least one ethylene vinyl alcohol copolymer, said ethylene vinyl alcohol copolymer having from about 2 to about 8 mol % 1,2 glycol structural units present in the polymer chain and said gas barrier layer being positioned between said structural layer and said heat sealing layer; and
   D) an adhesive layer wherein said adhesive layer comprises:
      1) at least one functionalized polymer component selected from the group consisting of a) anhydride-modified polymers, b) copolymers comprising copolymerized units of ethylene and a comonomer selected from the group consisting of $C_4$-$C_8$ unsaturated anhydrides, monoesters of $C_4$-$C_8$ unsaturated acids having at least two carboxylic acid groups, diesters of $C_4$-$C_8$ unsaturated acids having at least two carboxylic acid groups and c) mixtures thereof,
      2) an ethylene copolymer, chemically distinct from said functionalized polymer component, comprising copolymerized units of ethylene and a comonomer selected from the group consisting of alpha-olefins, vinyl acetate, alkyl acrylates, alkyl methacrylates and mixtures thereof, said alkyl groups having from 1 to 10 carbon atoms; and optionally
      3) a tackifier resin
   characterized in that i) said multilayer film is capable of shrinking to a size that is at least 25% less than its original size on initial exposure of said film to a temperature of 85° C. for at least one minute and further characterized in that after exposure to a temperature of 85° C. for at least one minute, said film will maintain a percent shrinkage of at least 30% less than its original size in both the machine and transverse directions for a period of at least ten weeks and ii) the secant modulus of said multilayer film in either of the machine or transverse directions, is in the range of 206-268 MPa when measured in accordance with ASTM D882.

2. A multilayer heat shrinkable film of claim 1 that is biaxially oriented.

3. A multilayer heat shrinkable film of claim 1 wherein said $C_3$ to $C_8$ α,β-ethylenically unsaturated carboxylic acid is acrylic acid or methacrylic acid.

4. A multilayer heat shrinkable film of claim 1 wherein said copolymer of ethylene and a $C_3$ to $C_8$ α,β-ethylenically unsaturated carboxylic acid additionally comprises copolymerized units of at least one other comonomer.

5. A multilayer heat shrinkable film of claim 1 wherein the structural layer comprises an ionomer of a copolymer of ethylene and a $C_3$ to $C_8$ α,β-ethylenically unsaturated carboxylic acid.

6. A multilayer heat shrinkable film of claim 1 wherein the structural layer comprises a polyester.

7. A multilayer heat shrinkable film of claim 1 wherein the structural layer comprises an ionomer.

8. A multilayer heat shrinkable film of claim 1 wherein the heat sealing layer consists essentially of an ethylene vinyl acetate copolymer.

9. A multilayer heat shrinkable film of claim 1 wherein the heat sealing layer consists essentially of a copolymer selected from the group consisting of ethylene alkyl acrylate copolymers and ethylene alkyl methacrylate copolymers.

10. A multilayer heat shrinkable film of claim 1 wherein the heat sealing layer consists essentially of a polyethylene.

11. A multilayer heat shrinkable film of claim 1 comprising additional layers.

12. A multilayer heat shrinkable film of claim 1 comprising at least one additional adhesive tie layer.

13. A multilayer heat shrinkable film of claim 1 in the form of a tube.

14. A multilayer heat shrinkable film of claim 1 wherein said structural layer is adjacent to and in contact with said gas barrier layer.

15. A multilayer heat shrinkable film of claim 1 wherein said heat seal layer is adjacent to and in contact with said gas barrier layer.

16. An article formed from the multilayer film of claim 1.

17. A multilayer heat shrinkable film of claim 1 wherein the secant modulus of the multilayer film both in the machine direction and in the transverse direction is less than 220 MPa, as measured according to ASTM D882.

18. A multilayer heat shrinkable film of claim 1 wherein the ethylene copolymer, chemically distinct from said functionalized polymer component is a mixture of ethylene copolymers.

19. A multilayer heat shrinkable film of claim 18 wherein the mixture of ethylene copolymers comprises a mixture of two or more ethylene vinyl acetate copolymers.

20. A multilayer heat shrinkable film of claim 18 wherein the mixture of ethylene copolymers comprises a mixture of two or more ethylene alkyl acrylate copolymers.

21. A multilayer heat shrinkable film of claim 18 wherein the mixture of ethylene copolymers comprises a mixture of two or more ethylene alkyl methacrylate copolymers.

22. A multilayer heat shrinkable film of claim 1 wherein the adhesive layer comprises a mixture of an ethylene alpha-olefin polymer and an ethylene copolymer selected from the group consisting of ethylene vinyl acetate copolymers, ethylene alkyl acrylate copolymers and ethylene alkyl methacrylate copolymers.

23. A multilayer oriented heat shrinkable film of claim 1 wherein the secant modulus in the transverse direction is less than about 220 MPa.

24. A shrinkbag comprising an oriented multilayer film, said oriented film comprising:
   A) a structural layer comprising a polymer selected from the group consisting of copolymers of ethylene and a $C_3$ to $C_8$ α,β-ethylenically unsaturated carboxylic acid, ionomers of said copolymers, polyesters, and blends thereof;
   B) a heat sealing layer consisting essentially of a polymer selected from the group consisting of ethylene vinyl acetate copolymers, ethylene alkyl acrylate copolymers, ethylene alkyl methacrylate copolymers, polyethylene, and blends thereof;

C) a gas barrier layer comprising at least one ethylene vinyl alcohol copolymer, said ethylene vinyl alcohol copolymer having from about 2 to about 8 mol % 1,2 glycol structural units present in the polymer chain, said gas barrier layer being positioned between said structural layer and said heat sealing layer; and D) an adhesive layer wherein said adhesive layer comprises:
1) at least one functionalized polymer component selected from the group consisting of a) anhydride-modified polymers, b) copolymers comprising copolymerized units of ethylene and a comonomer selected from the group consisting of $C_4$-$C_8$ unsaturated anhydrides, monoesters of $C_4$-$C_8$ unsaturated acids having at least two carboxylic acid groups, diesters of $C_4$-$C_8$ unsaturated acids having at least two carboxylic acid groups and c) mixtures thereof,
2) an ethylene copolymer, chemically distinct from said functionalized polymer component, comprising copolymerized units of ethylene and a comonomer selected from the group consisting of alpha-olefins, vinyl acetate, alkyl acrylates, alkyl methacrylates and mixtures thereof, said alkyl groups having from 1 to 10 carbon atoms; and optionally
3) a tackifier resin characterized in that i) said film is capable of shrinking to a size that is at least 25% less than its original size on initial exposure of said film to a temperature of 85° C. for at least one minute and further characterized in that after exposure to a temperature of 85° C. for at least one minute, said film will maintain a percent shrinkage of at least 30% less than its original size in both the machine and transverse directions for a period of at least ten weeks; and ii) the secant modulus of said multilayer film in either of the machine or transverse directions is within the range 206-268 MPa when measured in accordance with ASTM D882.

25. A shrinkbag of claim 24 wherein said structural layer comprises a copolymer of ethylene and a $C_3$ to $C_8$ α,β-ethylenically unsaturated carboxylic acid wherein said acid is acrylic acid or methacrylic acid.

26. A shrinkbag of claim 24 wherein said structural layer comprises an ionomer of a copolymer of ethylene and a $C_3$ to $C_8$ α,β-ethylenically unsaturated carboxylic acid.

27. A shrinkbag of claim 24 wherein said multilayer film comprises additional layers.

28. A shrinkbag of claim 24 wherein said multilayer film is a biaxially oriented film.

* * * * *